(12) United States Patent
Ruffing et al.

(10) Patent No.: US 9,973,637 B2
(45) Date of Patent: *May 15, 2018

(54) WEARABLE CAPTURED IMAGE DATA RELAY DEVICE

(71) Applicants: Joice S. Ruffing, Abilene, TX (US); Juliana S. Evans, Katy, TX (US)

(72) Inventors: Joice S. Ruffing, Abilene, TX (US); Juliana S. Evans, Katy, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/460,627

(22) Filed: Mar. 16, 2017

(65) Prior Publication Data
US 2017/0187891 A1    Jun. 29, 2017

Related U.S. Application Data

(63) Continuation-in-part of application No. 15/250,235, filed on Aug. 29, 2016, which is a continuation-in-part of application No. 14/460,842, filed on Aug. 15, 2014, now Pat. No. 9,429,991, and a continuation-in-part of application No. 14/181,902, filed on Feb. 17, 2014, now abandoned.

(60) Provisional application No. 62/399,659, filed on Sep. 26, 2016.

(51) Int. Cl.
*H04N 1/00* (2006.01)
*H04N 1/21* (2006.01)
*G06F 1/16* (2006.01)

(52) U.S. Cl.
CPC ......... *H04N 1/00103* (2013.01); *G06F 1/163* (2013.01); *G06F 1/1698* (2013.01); *H04N 1/00339* (2013.01); *H04N 1/2129* (2013.01); *H04N 2201/0055* (2013.01); *H04N 2201/214* (2013.01)

(58) Field of Classification Search
None
See application file for complete search history.

(56) References Cited

U.S. PATENT DOCUMENTS 9,429,991 B1 *    8/2016    Ruffing ................... G06F 1/163

* cited by examiner

*Primary Examiner* — Kristy A Haupt
(74) *Attorney, Agent, or Firm* — The Juhasz Law Firm (57) ABSTRACT

A wearable wireless image data relay device for positioning on a limb of a wearer may include a band configured to at least partially encircle the limb of the wearer; a storage mounted on the band and configured to store image data; and a transceiver mounted on the band and configured to detect wireless transmission of the image data from at least one camera, wirelessly receive the transmission of the image data from the at least one camera to enable storage of the image data within the storage, form a wireless coupling with a receiving device, and in response to formation of the wireless coupling and the storage of the image data within the storage, wirelessly transmit the image data from the storage to the receiving device.

20 Claims, 5 Drawing Sheets

WEARABLE CAPTURED IMAGE DATA RELAY DEVICE

CROSS-REFERENCE TO RELATED APPLICATIONS

This application is a continuation-in-part of U.S. patent application Ser. No. 15/250,235 entitled "Wearable Memory Card Holder" and filed Aug. 29, 2016; which is a continuation-in-part of U.S. patent application Ser. No. 14/460,842 entitled "Wearable Memory Card Holder" and filed Aug. 15, 2014 (now issued as U.S. Pat. No. 9,429,991); which is a continuation-in-part of U.S. patent application Ser. No. 14/181,902 entitled "Wearable Memory Card Holder" and filed Feb. 17, 2014 (abandoned); the disclosures of all three of which are incorporated by reference herein in their entirety. This application also claims the benefit of U.S. Provisional Application No. 62/399,659 entitled "Wearable Memory Card Holder" and filed Sep. 26 2016, the disclosure of which is incorporated by reference herein in its entirety.

FIELD

The present disclosure relates to apparel and more particularly pertains to a new wearable captured image data relay device for temporarily storing and retransmitting image data between cameras and other devices used to perform post-capture processing or other operations with image data. Secondarily, the present disclosure pertains to a new card holder for carrying one or two or more memory cards on the body of the card user in a location that is convenient for quick access while performing other tasks.

SUMMARY

In one aspect, the present disclosure relates to a wearable memory card holder for positioning on a limb of a wearer. The holder may comprise a band for at least partially encircling a limb of the wearer and a memory card receptacle integrated with the band and configured to receive at least one memory card.

In another aspect, the disclosure relates to a wearable memory card holder for positioning on a wrist of a wearer. The holder may comprise a band configured to form a loop to removably encircle a limb of the wearer, with the band forming a loop of adjustable circumference. The holder may also comprise a memory card receptacle integrated with the band and forming a socket including a cavity with a slot opening into the cavity for receiving one or more memory cards.

In still another aspect, the disclosure relates to a system including a memory card and a wearable memory card holder that may comprise a band configured to form a loop to removably encircle the limb of the wearer, the band forming a loop of adjustable circumference. The holder may also include a memory card receptacle integrated with the band and forming a socket including a cavity with a slot opening into the cavity. The memory card may be removably received in the socket of the memory card receptacle.

In one aspect, the disclosure relates to a wearable captured image data relay device for positioning on a limb of a wearer. The captured image data relay device may comprise a band for at least partially encircling a limb of the wearer; a transceiver configured to receive image data captured by one or more cameras, and to retransmit the received image data to another device; and a storage to temporarily store the received image data prior to retransmission to the other device.

In another aspect, the disclosure relates to a wearable captured image data relay device for positioning on a wrist of a wearer to relay captured image data wirelessly received from one or more cameras to another device for processing. The wearable captured image data relay device may comprise a band configured to form a loop of adjustable circumference to removably encircle a limb of the wearer. The wearable captured image data relay devise may also comprise a memory card receptacle integrated with the band and forming a socket to receive one or more memory cards for use in temporarily storing the received captured image data prior to retransmission to the other device.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 7 thereof, a new wearable wireless captured image data relay device embodying the principles and concepts of the disclosed subject matter will be described. Secondarily, such a wearable device may also serve as a wearable memory card holder also embodying the principles and concepts of the disclosed subject matter.

The applicants have recognized that, while digital photography and videography has simplified the creative process in many ways, the digital format is not without difficulties. Digital photos and videos encourage the professional photographer and videographer to take many more photos and minutes of video without having to worry about wasting film on poor shots, as poor photos and video may easily be deleted, and the digital memory cards are able to hold many more shots and minutes of video than analog film could. However, the storage of digital memory cards is not infinite, especially for photos and video taken at higher definitions, and therefore the cards do need to be changed out from the camera when full to capacity and replaced with another memory card. During photography and video filming, the interchange of memory cards can be just as interruptive as the changing of film, and even though the relatively small size of the video cards can make the cards more portable it may also make the cards more difficult to locate in a photography gear bag in a quick manner.

Applicants have, first, devised a solution to the problem of collecting captured image data from one or more cameras without the use of memory cards as a transfer medium for such data by employing the wireless output capabilities of a growing number of available video and still image cameras. Applicants have also, second, devised a convenient holder of memory cards that enables easier carrying and locating of memory cards by carrying one or more memory cards on the body of a photographer or videographer in an easily accessible location for interchanging an empty memory card for a full memory card in the camera.

Turning more specifically to FIGS. 1-4, this disclosure is initially directed to a wearable memory card holder 10 for positioning on a limb 1 of a wearer and removably receiving a memory card 2. The holder 10 may be configured to substantially encircle an arm of the wearer, such as in the forearm or wrist region of the arm. The holder may thus constitute a wrist-mountable device, and may be embodied as a bracelet.

Figure 1:
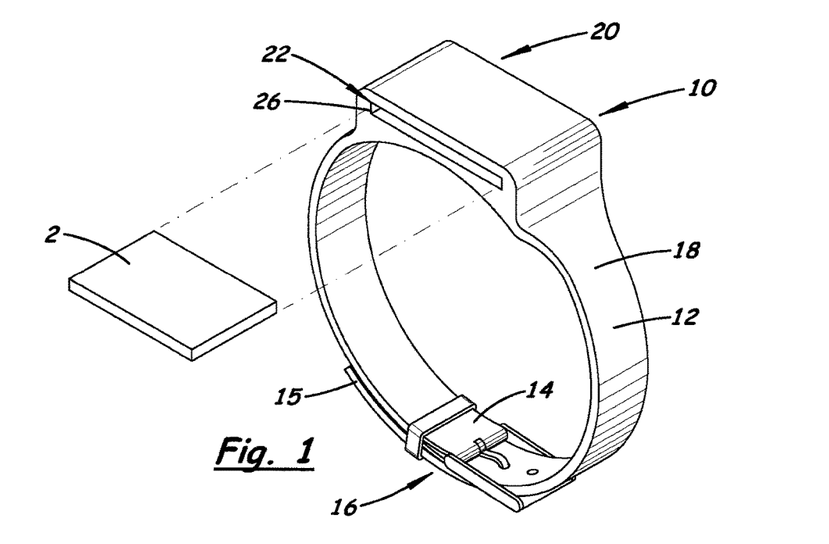
FIG. 1 is a perspective view of a new wearable memory card holder according to the present disclosure.
Figure 2:
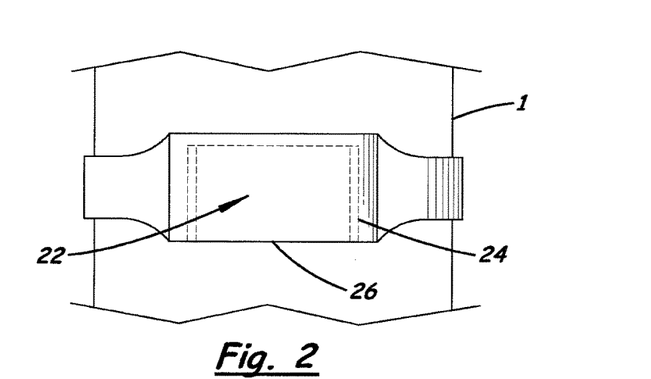
FIG. 2 is a top view of the holder worn on an arm according to an illustrative embodiment.
Figure 3:
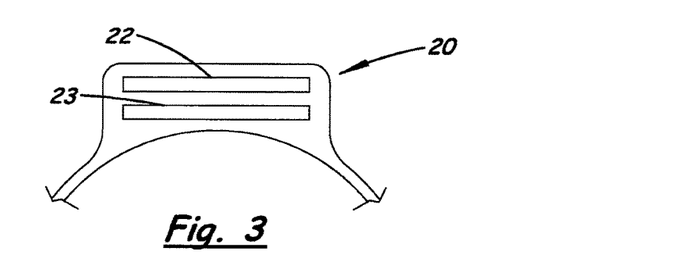
FIG. 3 is a partial side view of the holder according to an illustrative embodiment.
Figure 4:
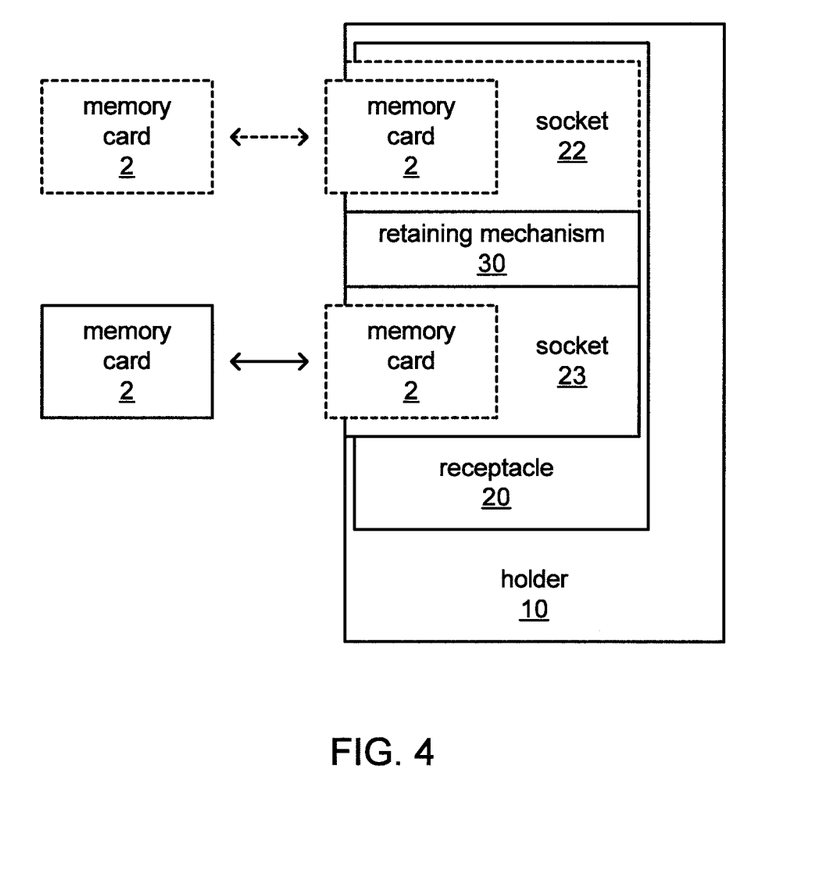
FIG. 4 is a block diagram of the holder according to an illustrative embodiment.

In some greater detail, the holder 10 may comprise a band 12 for at least partially encircling the wrist of the wearer. The band 12 may form a continuous loop, although a partial or incomplete loop may also be employed. The band 12 may have opposite ends 14, 15 that are releasably connectable together to removably mount the loop on the limb of the wearer. The band 12 is preferably formed of a material that is flexible to permit the band to be flexed and curved about the wrist of the user to generally conform to the shape of the forearm of the user, although the band does not have to form a tight or snug fit about the wrist. In some embodiments, portions of the band may be relatively more flexible and other portions may be relatively less flexible, and as an example, the portions towards each of the ends 14, 15 of the band may be more flexible while a central portion in between the end portions is relatively less flexible, and may not have any flexibility at all. The releasable connection for the ends 14, 15 may be formed in any suitable connector structure 16 known to those skilled in the art such as, for example, clasps, snaps, buckles, and the like. Further, the loop may have an adjustable circumference size to accommodate different wrist sizes and may help provide a snug fit that resists inadvertent removal or loss. Illustratively the connector structure may be a conventional frame and prong configuration, although other structures may be utilized. The band 12 may have an exterior surface 18 that forms the exterior of the band. The exterior surface of the band may be decorated in any desired manner and may have many different styles from the plain and utilitarian (as illustrated in the drawings) to the pretentious.

The holder 10 may also include a memory card receptacle 20 that is configured to receive one or more memory cards 2. The receptacle 20 may be integrated with the band 12 so that the receptacle cannot be removed from the band, although the disclosure is not limited to embodiments in which the receptacle cannot be removed, and in some embodiments removability of the receptacle may be employed. The receptacle 20 may form a socket 22 that includes a cavity 24 with a slot opening 26 sized and shaped to receive at least a portion of the memory card 2. A memory card may be moved into a storage position with respect to the receptacle in which substantially an entirety of the card is positioned in the slot opening 26 and cavity 24 to help protect the card while the wearer acts and moves in a normal manner without concern for the holder 10 or the card 2. The storage position is not necessarily limited to a condition where the whole card is inserted into a cavity, and it should be recognized that the slot opening 26 may be located in and defined by the exterior surface 18 of the band, and may lead into the interior of the cavity 24 of the socket.

The card receptacle 20 may include a retaining mechanism 30 configured to permit the memory card to be moved into the storage portion in the socket and held in the storage position until a subsequent push on the memory card (or a lever adjacent the card) causes the mechanism to move the card from the storage portion to an eject position in which the card is at least partially ejected or moved out of the storage position which facilitates finger gripping of the card to pull the card completely out of the receptacle. Other means for retaining the card in the socket may utilized, such as those that exert a frictional grip or hold on the card that may be overcome by a sufficient degree of pulling on a portion of the card exposed out of the socket.

In some embodiments of the holder 10, the receptacle 20 may form a pair of sockets 22, 23 which are capable of simultaneously each holding one of a pair of cards in storage positions. In this configuration, additional cards 2 may be interchanged with the camera of the user.

Memory cards are available under a number of standards, including Compact Flash (CF), SmartMedia (SM), Memory Stick (MS), Multimedia Card (MMC), Secure Digital (SD), xD-Pictire Card (XD), as well as many others under standards previously developed and standards to be developed in the future. Although the memory card formats may be standardized, the size and shapes of the cards under the different standards can vary, and even within one particular memory card standard there may be "mini" and "micro" variations. To some degree the variations in size and shape may be accommodated by a single socket configuration, and the sockets commonly employed on computers for memory card readers provide enabling examples of sockets able to accept cards of different standards. Although a significant number of different memory card sizes may be accommodated by these known designs, it is possible that holders of different socket configurations may need to be employed to accommodate all of the different memory card standards.

It should be recognized that in most of the preferred embodiments of the holder, insertion of the memory card into the socket does not create an electrical contact or communication with any device that would access the circuits on the card or access the information or data stored on the card. The socket of the holder is merely provided for the purpose of providing storage and protection of the memory card between uses of the card in an electronic device that is able to electrically communicate with the circuitry of the memory card.

Figure 5:
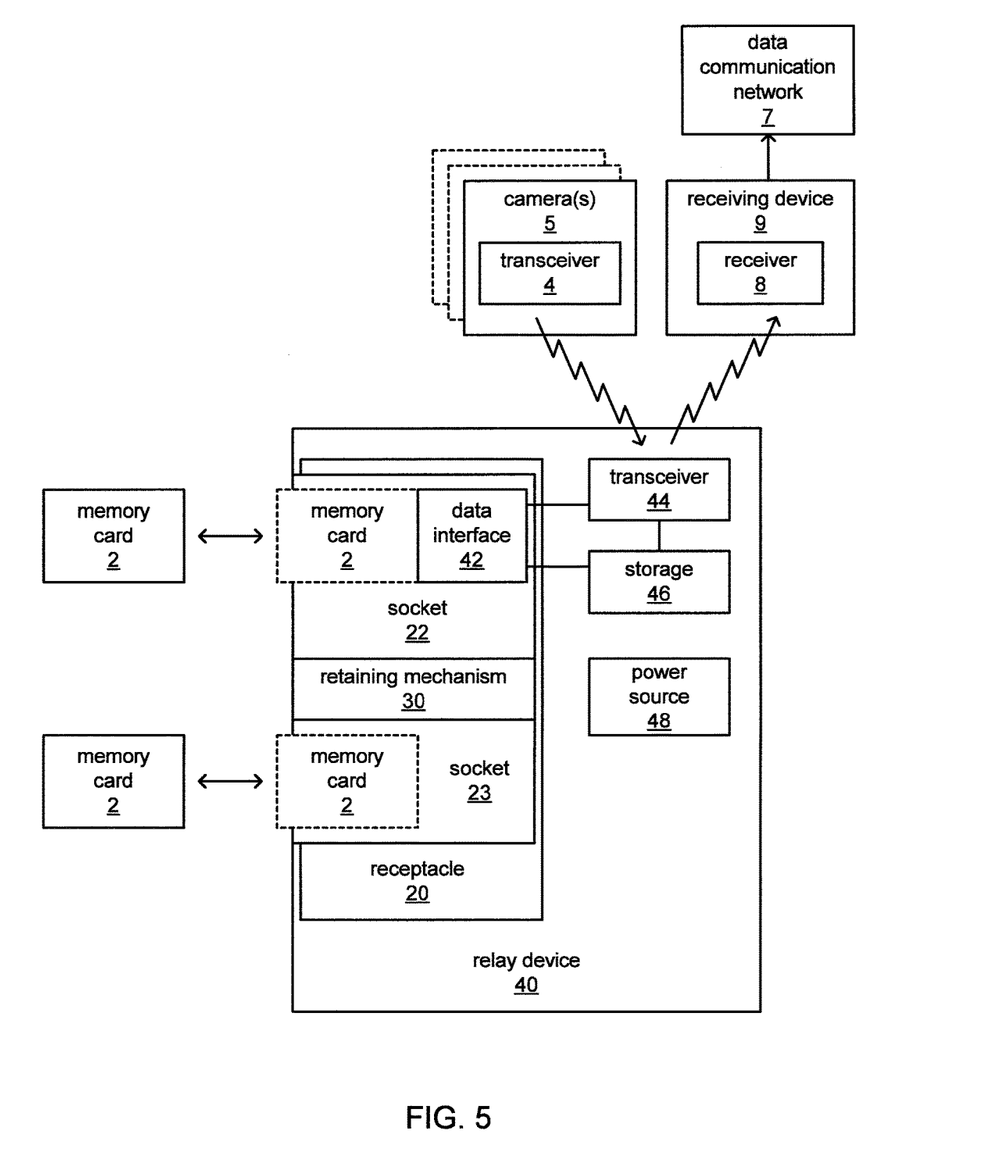
FIG. 5 is a schematic block diagram of a new wearable captured image data relay device according to the present disclosure.
Figure 6:
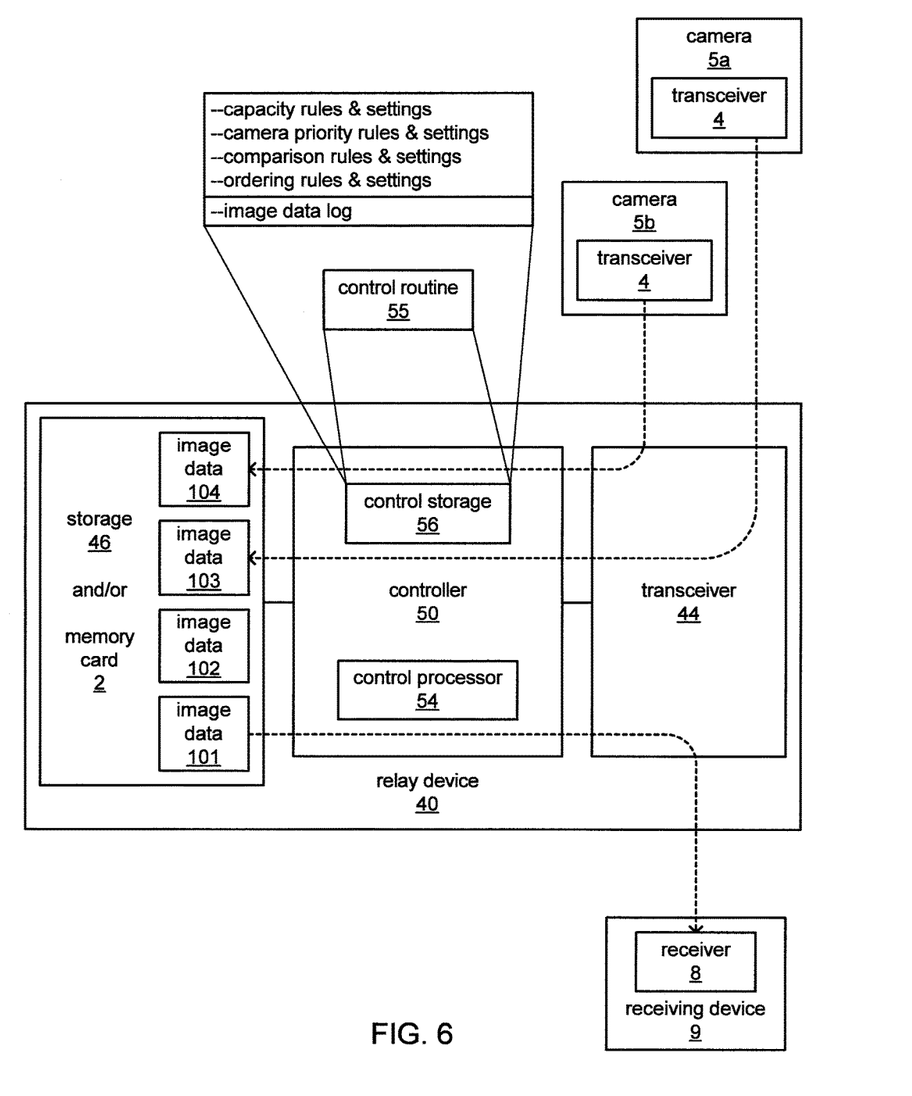
FIG. 6 is a block diagram of the captured image data relay device according to an illustrative embodiment.
Figure 7:
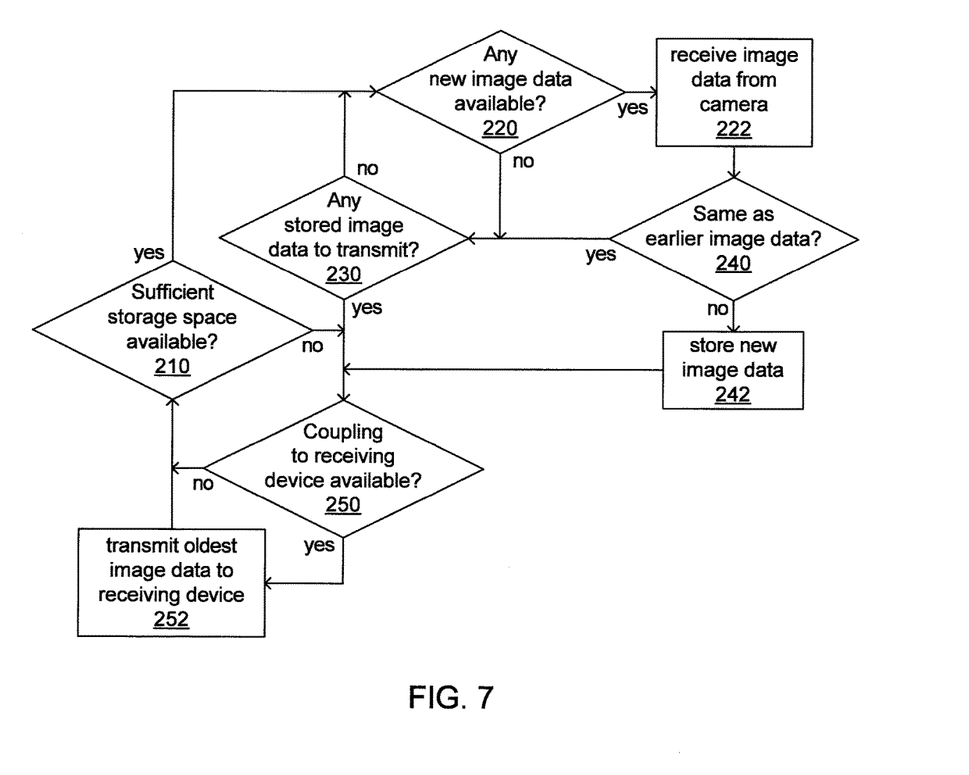
FIG. 7 is a flowchart of the captured image data relay device according to an illustrative embodiment.

Turning more specifically to FIGS. 5 through 7, some embodiments of a captured image data relay device 40 may include a capability to receive and re-transmit captured image data, such as data files for motion video and/or still images captured by one or more cameras 5 (e.g., the example multiple cameras 5a and 5b depicted in FIG. 6). As will be explained in greater detail, either cable-based or wireless communications may be used in the reception and/or re-transmission of image data in various embodiments. However, it may be deemed preferable for wireless communications to be employed for the sake of convenience of the wearer of the relay device 40. Additionally, the relay device 40 may also download such image data from a memory card 2 into which such data files have been stored by the one or more cameras 5 in response to the memory card 2 being inserted into the receptacle 20 of the relay device 40. Thus, the relay device 40 may be incorporated into and/or may also serve as a variant of the aforedescribed holder 10.

In greater detail, the relay device 40 may include a data interface 42 that is mounted on the band 12 and may be configured to read data stored within a memory card 2 by the one or more cameras 5 when the memory card 2 is received in the memory card receptacle 20 of the relay device 40. The data interface 42 may be configured to establish a data connection with the memory card 2 when received in the socket 22 of the receptacle, such as when the card is in the storage position with respect to the receptacle 20. The data interface 42 may have any suitable configuration, but may include a plurality of electrical contacts positioned in the socket to contact the contacts that are positioned on the exterior of the memory card 2. The data interface 42 may be suitably programmed and physically configured to read data from the memory card 2, and may also be configured to recognize the type and communication protocol for the particular type of memory card 2 which is engaged with the receptacle 20, particularly if the data interface 42 is designed and intended to work with memory cards 2 of a variety of different standards.

The relay device 40 may further include a transceiver 44 that is mounted on the band 12 and configured to wirelessly transmit data from a memory card 2 when the card is inserted into the memory card receptacle 20, and suitably connected to the data interface 42. The transceiver 44 may be in communication with the data interface 42 to in turn be in communication with a memory card 2 received by the card receptacle 20, and may be able to receive data read from the memory card 2 by the data interface 42 when the memory card 2 is inserted into the memory card receptacle 20. The transceiver 44 may be integrated into the band 12 so that the transceiver 44 remains with the band 12 at all times.

The transceiver 44 may be configured to communicate with a receiver 8 of a receiving device 9 that is external to the relay device 40 through wirelessly transmitted signals using any suitable communication standard. A few examples include Wi-Fi, Bluetooth, and near field communication (NFC), and typically may include standards that use relatively short range wireless communication, such as those that reach up to about 500 feet. Longer range wireless communications may require a significant amount of power that is not able to be supplied to the transceiver 44 in a practical fashion. The receiver 8 of the receiving device 9 may be any suitable receiver of signals of the protocol(s) being utilized by the transceiver 44. The receiver 8 may be associated with a network interface, which may include a wireless router, and may also interfaced with a larger data communication network 7 such as, for example, the Internet. The transferred data may then be transmitted to other locations, including servers that function to store such information for later retrieval and is colloquially referred to as the "cloud."

The relay device 40 may also include a power source 48 that is configured to provide power to the transceiver 44 and the data interface 42, as well as any other elements of the relay device 40 that require electrical power. In some embodiments, the power source 48 comprises a battery, and the battery may be of the rechargeable type or the replaceable type.

In various embodiments, the relay device 40 may have similar physical features to the earlier-discussed holder 10, including and not limited to, incorporating both the receptacle 20 and the band 12. As was discussed in greater detail in reference to the receptacle 20 of the holder 10, the receptacle 20 of the relay device 40 may incorporate a single socket 22, or more than one socket, such as the sockets 22 and 23 depicted in FIG. 3. As was also discussed above in reference to the holder 10, in different embodiments, the band 12 may be formed integrally with the receptacle 20 or may be separable from the receptacle 20. In embodiments in which the band 12 is separable from the receptacle 20, the receptacle 20 may be capable of being coupled to any of a variety of different implementations of the band 12, among which may be implementations of the band 12 that are of different sizes such that different implementations of the band 12 may have different widths, different lengths and/or different thicknesses. Alternatively or additionally, the different implementations of the band 12 to which the receptacle 20 may be separably coupled may include implementations having different shapes and/or may include implementations fabricated from different materials.

In various embodiments, the receptacle 20 of the relay device 40 may incorporate one or more of the sockets 22 and/or 23 to receive and physically retain one or more memory cards 2 of any of a variety of physical dimensions and/or shapes, as previously discussed in reference to the receptacle 20 of the holder 10. Similarly, the receptacle 20 of the relay device 40 may incorporate the retaining mechanism 30 which may employ any of a variety of techniques to physically retain a memory card 2 within one of the sockets 22 or 23. Such techniques may include, and are not limited to, friction acting on one or more surfaces of a memory card 2 with a portion of the memory card 2 caused to remain outside of the socket 22 or 23 to allow the wearer of the relay device 40 to pull the memory card 2 therefrom with enough force to overcome such friction by grasping that portion between at least two digits of a hand; a retaining tray (not shown) that is slidable into and out of the socket 22 or 23 in a manner akin to a cabinet drawer to hold a memory card 2 within the tray within that socket; or a spring-biased ejecting mechanism that retains a memory card 2 within the socket 22 or 23 until a push of a button (other form of manual operation of another form of manual control) accessible to the wearer at an external location of the relay device 40 triggers the use of a spring to urge the memory card 2 out of the socket 22 or 23.

In embodiments in which the relay device 40 incorporates multiple sockets, the multiple sockets may include at least one of the multiple sockets that does not include the ability to electrically interface with and/or read data from a memory card 2, and at least one other of the multiple sockets that does include the ability to electrically interface with and/or read data from a memory card 2. Stated differently, in embodiments in which there are multiple ones of the sockets 22 and/or 23, at least one of the multiple sockets (e.g., the socket 23) may be configured to physically retain a memory card 2, but not to electrically interface with it, while at least one other of the multiple sockets (e.g., the socket 22) may be configured to include the data interface 42 to electrically interface with a memory card 2 and to read data therefrom. Such differences in functionality among multiple sockets of the relay device 40 may be employed to provide physical storage for one or more empty memory cards 2 (e.g., ones of the memory card 2 that have not previously been used, or that have been erased in preparation for new use), while also providing interfacing to at least one memory card 2 within which data is stored.

In various embodiments, the relay device 40 may additionally incorporate a storage 46 into which data read from a memory card 2 by the data interface 42 may be stored. As familiar to those skilled in the art, memory cards 2 may each have any of a wide range of storage capacities (e.g., from one or more megabytes to hundreds of gigabytes), and the storage 46 of the relay device 40 may be configured to have a storage capacity selected to match, or to be at least relatively similar to, storage capacities expected to be provided by one or more memory cards 2. Mores specifically, the storage 46 of the relay device 40 may be configured to have sufficient storage capacity as to be capable of storing all data that is stored in at least one memory card 2, or more than one memory card 2. Such storage, by the relay device 40, of the data stored within one or more memory cards 2 may be employed to provide a backup to the storage of the data within those one or more memory cards 2 to prevent loss of that data in the event that any of the one or more memory cards 2 is lost or damaged. In some of such embodiments, the data interface 42 may monitor a socket or more than one socket (e.g., one or more of the sockets 22 and 23) to detect insertion of a memory card 2, and may be triggered to read the data stored in a memory card 2 for storage within the storage device incorporated into the relay device 40 as a result of detecting insertion of a memory card 2 into a socket.

In various embodiments, the storing of the data stored within one or more memory cards 2 into a storage 46 of the relay device 40 may alternatively or additionally serve to buffer such data for subsequent transmission by the transceiver 44 to the receiver 8. More specifically, such storage of data read from one or more memory cards 2 into such the storage 46 of the relay device 40 may enable transmission to the receiver 8 of the receiving device 9 at a later time when none of the one or more memory cards 2 are still coupled in any way to the relay device 40. Stated differently, such embodiments of the relay device 40 may serve as relay devices to store data read from one or more memory cards 2 in preparation for subsequent transfer to the receiver 8 at a later time when all of the one or more memory cards 2 may have been removed from all sockets of the relay device 40.

In various embodiments, as an alternative to or in addition to such use of one or more memory cards 2 as a transfer medium in transferring data from one or more cameras 5 to the relay device 40 for subsequent transmission by the transceiver 44 of the relay device 40 to the receiver 8 of the receiving device 9, the transceiver 44 of the relay device 40 may directly receive data from the one or more cameras 5. In such embodiments, the transceiver 44 may recurringly check for a coupling (whether wireless or cabling-based) to the transceiver 4 of each of one or more cameras 5 and/or an opportunity to form such a coupling. The transceiver 44 and/or the transceiver 4 of a camera 5 may be triggered to cooperate to transfer data captured by the camera 5 from the transceiver 4 of the camera 5 to the transceiver 44 of the relay device 40. Such transmissions may be made wirelessly in a manner that conforms to any of a variety of known standards for wireless data transmission, including and not limited to, any of the 802.11 series wireless transmission standards promulgated by the Institute of Electrical and Electronics Engineers (IEEE), Wi-Fi, Bluetooth, NFC, etc. Alternatively or additionally, such transmissions may be made via electrically and/or optically conductive cabling in a manner that may conform to any of a variety of known standards to cable-based data transmission, including and not limited to, Toslink, any of the 802.3 series of standards promulgated by IEEE for Ethernet, the 1394 standard promulgated by IEEE for FireWire, Universal Serial Bus (USB), etc.

Regardless of the nature of the wireless or cabling-based coupling that is employed in such transfers of such data, the storage 46 of the relay device 40 may store the data upon its receipt from the camera 5 via such a transfer through such a coupling. Again, such storage of data within the storage 46 of the relay device 40 may serve to buffer that data for subsequent transmission by the transceiver 44 of the relay device 40 to the receiver 8 of the receiving device 9. In such embodiments, the storage 46 of the relay device 40 may be configured to have a storage capacity selected to accommodate a predetermined quantity of data that may be expected to be received from a camera 5 through such a coupling over a predetermined period of time. The selection of such a predetermined period of time may be based on an assessment of the amount of time for which the power source 48 has the capacity to support operation of the transceiver 44 to receive data from a camera 5. Alternatively or additionally, the relay device 40 may incorporate at least a single socket 22 to receive at least one memory card 2 to enable the at least one memory card 2 to be employed to store data received by the transceiver 44 from a camera 5, either as an alternative to or in addition to incorporating the storage 46 into the relay device 40.

Regardless of whether data is conveyed to the relay device 40 by one or more memory cards 2 or as a result of being received by the transceiver 44 across a coupling formed between the transceiver 44 and a device such as a camera 5, the transceiver 44 may transmit data stored within the storage 46 of the relay device 40 (and/or from a memory card 2 within a socket of the relay device 40) to the receiver 8 of the receiving device 9 by any of a variety of wireless or cabling-based couplings. As previously discussed, such transmissions may be made wirelessly in a manner that conforms to any of a variety of known standards for wireless data transmission, including and not limited to, any of the 802.11 series wireless transmission standards, Wi-Fi, Bluetooth, NFC, etc. Alternatively or additionally, such transmissions may be made via electrically and/or optically conductive cabling in a manner that may conform to any of a variety of known standards to cable-based data transmission, including and not limited to, Toslink, any of the 802.3 series of standards, the 1394 standard for FireWire, Universal Serial Bus (USB), etc.

Regardless of the nature of the wireless or cable-based coupling that is employed in such transmissions from the transceiver 44 to the receiver 8 of the receiving device 9, the receiving device 9 may be any of a variety of devices, including and not limited to, a server or gateway device providing access to multiple servers, a wireless access point (WAP), a network router, a broadband cable or digital subscriber line (DSL) modem, a desktop computer or portable computer, a smartphone or tablet computer, another body-worn device, a network-attached storage (NAS) device, etc. Where the receiver 8 is incorporated into and/or externally coupled to a desktop computer, portable computer, tablet computer or smartphone, one or more of such devices may be configured to execute and/or otherwise interoperate with any of a variety of operating systems and/or other software offered by any of a variety of corporations and/or other organizations, including and not limited to, iOS offered by Apple Inc., Windows offered by Microsoft Corporation, Linux offered by a wide variety of entities, Android OS offered by Google Inc., etc. The transceiver 44 may recurringly check for a coupling (whether wireless or cabling-based) to a receiver and/or an opportunity to form a coupling with a receiver (e.g., the receiver 8), and may be triggered to transmit data earlier read from a memory card 2 and stored within the storage 46 of the relay device 40 as a result of detection and/or formation of a coupling with a receiver (e.g., the receiver 8).

The relay device 40 may incorporate a controller 50 that may control the reception, storage and/or transmission of image data captured by the one or more cameras 5 based on one or more rules and/or based on one or more settings. In some embodiments, the controller 50 may incorporate one or both of a control storage 56 in which indications of such rules and/or settings may be stored, and/or a control processor 54 to execute the executable instructions of a control routine 55 that may also be stored within the control storage 56 to effect the reception, storage and/or transmission of image data in accordance with the indicated rule(s) and/or setting(s). Alternatively or additionally, a processing component of the transceiver 44 that controls aspects of the operation of the transceiver 44 to transmit and receive data (e.g., protocols, establishment of couplings, error detection and/or correction, etc.) may be employed to additionally control storage of image data.

Regardless of exactly which component of the relay device 40 may effect such rules or settings, among the rules may be one or more rules to control use of the finite storage space provided by the storage 46, and/or by a memory card 2, in embodiments that may employ a memory card 2 as storage for received image data that is to be retransmitted. By way of example, such rules may include a rule specifying a minimum amount of storage space that must be available within the storage 46 and/or a memory card 2 (in embodiments in which such use of a memory card 2 is supported) for the storage of new image data before more image data is to be solicited and/or accepted by the relay device 40 from any camera 5. Alternatively or additionally, in embodiments in which the use of both the storage 46 and a memory card 2 to store received image data is supported, such rules may include a rule specifying which of the storage 46 and a memory card 2 that may be inserted into a socket of the relay device 40 is to be used as the primary storage into which received image data is to be stored first before the other is used. Along with the stored indications of such rules may also be stored indications of related settings that an operator of the relay device 40 may have specified, such as the minimum amount of storage space that must be available before more image data is to be accepted and/or which one of the storage 46 and a memory card 2 is to be used as the primary storage.

Also, among the rules may be one or more rules to control prioritization of the reception of image data from multiple cameras 5 in situations where more than one camera 5 (e.g., the cameras 5a and 5b depicted in FIG. 6) are used in conjunction with the relay device 40. By way of example, such rules may include a rule specifying actions to take to resolve communication conflicts (e.g., radio frequency interference and/or competition for limited available reception bandwidth) between multiple cameras 5 where the transmissions of image data from one of the multiple cameras 5 (e.g., camera 5a) has been indicated in a setting provided by an operator of the relay device 40 to be of higher priority than the transmissions of image data from another of the multiple cameras 5 (e.g., camera 5b). Such a rule may specify that such conflicts are to be resolved by selecting to receive the image data transmitted by one of the cameras 5 with a higher priority, while ignoring the transmissions of image data by another of the cameras 5 with a lower priority. Along with the stored indications of such rules may also be stored indications of such related settings that an operator of the relay device 40 may have specified, such as which of one of multiple cameras 5 is to be given highest priority in its transmissions of image data.

Further, among the rules may be one or more rules to control the handling of duplicate copies of image data that may be received from a camera 5. By way of example, such rules may include a rule specifying a technique to be used to identify duplicate copies of image data, including and not limited to, comparing file names, date and/or time stamps, file header information, and/or hashes taken of each portion of image data that is received. Where new image data (whether already fully received or in the process of being received) is identified as a duplicate copy of image data already stored within the storage 46 and/or a memory card 2 of the relay device 40, the new image data may be discarded (if it has already been fully received), and/or the transceiver 44 may be operated to signal the camera 5 that is still in the process of transmitting the new image data to cease doing so. In support of such comparisons, the control storage 56 may store an image data log made up of any of a variety of types of identifier (e.g., hash values, file names, etc.) or other indicators of portions of image data that have already been previously received, stored and/or retransmitted by the relay device. Such a log may enable a duplicate copy of a portion of image data to be identified without requiring that the earlier received copy still be stored within the storage 46 and/or a memory card 2 to enable the comparison that leads to the identification to be made. Along with the stored indications of such rules may also be stored indications of related settings that an operator of the relay device 40 may have specified, such as whether such comparisons and/or elimination of duplicate image data is to be performed, and/or which technique(s) are to be employed to make such comparisons.

Still further, among the rules may be one or more rules to control the order in which image data is transmitted to the receiving device 9. By way of example, such rules may include a rule specifying the use of a first-in-first-out (FIFO) selection, a selection based on the time and/or date of capture of image data as indicated in time and/or date stamps incorporated into the image data (e.g., incorporated into data files of the image data), a selection based on size of captured image data (e.g., prioritize transmission of smaller or larger portions of image data, such as larger or smaller amounts of storage space occupied by each one of multiple still images and/or by each one of multiple motion videos), or a selection based on type of image data (e.g., prioritize transmission of still images or motion video). Along with the stored indications of such rules may also be stored indications of related settings that an operator of the relay device 40 may have specified, such as an indication of an operator selection of one or more of such rules to be used in selecting image data to transmit to the receiving device 9.

FIG. 7 depicts a flowchart of an example of logic that may be employed by the control processor 54 (or by a different processing component within the relay device 40, such as a processing component of the transceiver 44) in controlling the receipt, storage and/or transmission of image data. It should be noted that other embodiments of such logic are possible in which different criterion (e.g., different rules) may be employed in making determinations of a next action to take, and/or in which the order in which various determinations are made may be different.

As depicted, at 210, the control processor 54 (or other processing component within the relay device 40) may be caused by its execution of the control routine 55 to check whether there is sufficient storage space available within the storage 46 and/or within a memory card 2 (in embodiments in which use of a memory card 2 to temporarily store received image data is supported) to allow reception of more image data from a camera (e.g., one of the cameras 5). In performing this check, the control processor 54 may, in accordance with a rule, compare the amount of available storage space to a minimum threshold amount specified by a setting. If, at 210, there is insufficient storage space available, then the control processor 54 may be caused to check at 250 whether there is currently a coupling to a receiving device (e.g., the receiving device 9) by which image data already stored within the storage 46 and/or a memory card 2 may be transmitted to the receiving device to regain more available storage space.

However, if at 210, there is sufficient storage space available, then the control processor 54 may be caused to check at 220 whether there is currently any new image data available from a camera for reception by the relay device 40. If, at 220, there is currently no new image data available to be so received, then the control processor 54 may be caused to check at 230 whether there is currently any image data already stored within the storage 46 and/or a memory card 2 for transmission to the receiving device. If, at 230, there is currently no such already stored image data, then the control processor 54 may be caused to repeat the check at 220 for current availability of any new image data. However, if at 230, there is currently image data already stored within the storage 46 and/or a memory card 2 for transmission to the receiving device, then the control processor may be caused to check at 250 whether there is currently a coupling to the receiving device by which the already stored imaged data may be transmitted to the receiving device.

However, if at 220, there currently is new image data available from a camera to be received by the relay device 40, then the control processor 54 may be caused at 222 to operate the transceiver 44 to so receive the available new image data. At 240, the control processor 54 may then check whether the received new image data is a duplicate of image data already previously received, stored and/or already transmitted to the receiving device. If, at 240, the received new image data is such a duplicate, then the control processor 54 may be caused to check at 230 whether there is any already stored image data to be transmitted to the receiving device.

However, if at 240, the received new image data is not such a duplicate, then the control processor 54 may be caused to check at 250 whether there is currently a coupling to the receiving device by which the received new image data and/or other image data that was earlier stored within the storage 46 and/or a memory card 2 may be transmitted to the receiving device. If, at 250, there currently is no such coupling to the receiving device, then the control processor 54 may be caused to repeat the check for sufficient storage space at 210. However, if at 250, there currently is such a coupling to the receiving device, then the control processor 54 may be caused to operate the transceiver 44 to so transmit received new image data and/or other image data that was earlier stored within the storage 46 and/or a memory card 2.

It should be noted that, although embodiments of the relay device 40 that are configured to use the transceiver 44 to both receive and transmit image data may not include any sockets in which to receive a memory card 2, either with or without the ability to store image data therein and/or to retrieve image data therefrom, other embodiments are possible in which the relay device 40 may include one or more of the sockets 22 and/or 23 by which a memory card 2 may be removably received to enable image data to be both stored therein and/or retrieve therefrom. In such other embodiments, a memory card 2 may be used as an alternative mechanism by which image data may be conveyed to the relay device 40 from one or more cameras 5 and/or by which image data may be conveyed from the relay device 40 to the receiving device 9. Such an alternative mechanism may be provided to address a circumstance in which wireless communications between the relay device 40 and one or more cameras 5, or between the relay device 40 and the receiving device 9, is somehow prevented or interfered with (e.g., by a source of radio frequency interference). Alternatively or additionally, such an alternative mechanism may be provided to enable speedier relaying of the image data where use of a memory card 2 as a transfer medium would result in speedier relaying of the image data (e.g., when wireless communications are interfered with, or where a camera 5 or the receiving device 9 is capable of only relatively slow data transfer rates).

In various embodiments, the relay device 40 may incorporate one or more components that provide a user interface (UI) to the wearer, including and not limited to, one or more manually operable controls and/or visual indicators. The provision of such a UI may enable the wearer to monitor and/or control various aspects of the operation of the relay device 40. More specifically, the relay device 40 may incorporate one or more manually operable controls, such as buttons, lever and/or paddle switches, rotary and/or sliding variable controls, a keypad, a touchpad, a joystick, a trackball, etc. to enable the wearer to provide input to the relay device 40 as part of enabling control of various aspects thereof by the wearer. Among such controlled aspects may be turning some or all of the electrically based functionality of the relay device 40 on and/or off; manually triggering the reading of data stored in a memory card 2 by the data interface 42 and/or the storage of the data that is read therefrom into the storage 46 of the relay device 40; manually triggering the formation of a wireless coupling between the transceiver 44 and the transceiver 4 of a camera 5; manually triggering the reception of data from a camera 5 and/or storage of the data that is received therefrom into the storage 46 of the relay device 40 and/or into at least one memory card 2; manually triggering the formation of a wireless coupling between the transceiver 44 and the receiver 8 of the receiving device 9; and/or manual triggering the transmission of data stored within the storage 46 of the relay device 40 and/or from at least one memory card 2 by the transceiver 44 to the receiver 8.

Alternatively or additionally, the relay device 40 may incorporate one or more visual indicators, such as one or more indicator lights (e.g., one or more LEDs), a numeric and/or alphanumeric display (e.g., one or more 7-segment or 14-segment LED or LCD display components), an all-points-addressable (APA) display (e.g., a dot-matrix LED, electroluminescent or LCD display), etc. to provide indications of settings and/or status of one or more functions of the relay device 40. Among such settings and/or status that may be visually presented may be indications of a current power mode of the relay device 40 (e.g., a sleep mode, a lower power mode in which the transceiver 44 is disabled, a higher power mode in which all functions are enabled, etc.); indications of a current condition of a battery that may serve as the power source 48 (e.g., relatively close to depletion, fully charged, etc.); settings determining the conditions under which the reading, storage and/or transmission of data from a memory card 2 and/or the storage 46 of the relay device 40 is automatically triggered; indications of status of a wireless and/or cabling-based coupling between the transceiver 44 and the receiver 8 and/or between the transceiver 44 and a camera 5 (e.g., connected or disconnected status, strong or weak signal, data transmission in progress, speed of data transmission, etc.); indications of speed and/or progress in reading and storing of data from a memory card 2, in receiving data from a camera for storage into the storage 46 of the relay device 40 and/or into at least one memory card 2, and/or in transmitting data stored within the storage 46 of the relay device 40 and/or within at least one memory card 2 by the transceiver 44; indications of an error in the reading of data from or storing data within a memory card 2 (e.g., a checksum error); indications of an error in storing the data in the storage 46 of the relay device 40 (e.g., insufficient available storage space within the storage device); or indications of an error in reception of data from a transceiver 4 of a camera 5 and/or transmission of data to the receiver 8 of the receiving device 9 by the transceiver 44 (e.g., lack of acknowledgement of receiving a packet).

In embodiments in which the relay device 40 incorporates one or more visual indicators, manual operation of a manually operable control may be required to cause the one or more visual indicators to present indications of status and/or settings. This may be done as an approach to conserving power provided by the power source 48 in embodiments in which the power source 48 is a battery or other type of power source with a relatively limited capacity to provide electric power.

Alternatively or additionally, in embodiments in which the relay device 40 incorporates one or more visual indicators, the one or more visual indicators may include a touch-screen display (e.g., a dot matrix display incorporating touch sensing capabilities) based on any of a variety of possible combinations of display and touch sensing technologies. This may be done in addition to or in lieu of the relay device 40 incorporating one or more physically distinct manually operable controls. As familiar to those skilled in the art, graphical representations of various controls may be visually presented on such a touch-screen display to enable manual entry of input to the relay device 40 by the wearer by touching the locations at which those representations of controls are visually presented. Alternatively or additionally, in embodiments in which the relay device 40 incorporates one or more visual indicators, the one or more visual indicators may visually present the time of day, day of the week and/or date (e.g., may visually present a representation of a calendar, and/or of a circular analog watch face that may include representations of a rotating hour hand and/or a rotating minute hand). Alternatively or additionally, in embodiments in which the relay device 40 incorporates one or more visual indicators, the one or more visual indicators may visually present a timer that may be operable by the wearer to time an activity of the wearer (e.g., time spent using a camera 5 to capture photos and/or video at a photo session or other event), where the timer functionality is controllable through one or more physically distinct manually operable controls that may be incorporated into the relay device 40 and/or through visual representations of controls supported with touch-screen functionality of the one or more visual indicators.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A wearable wireless image data relay device for positioning on a limb of a wearer, the relay device comprising:
a band configured to at least partially encircle the limb of the wearer;
a storage mounted on the band and configured to store image data; and
a transceiver mounted on the band and configured to:
detect wireless transmission of the image data from at least one camera, wherein the image data is captured by the at least one camera;
wirelessly receive the transmission of the image data from the at least one camera to enable storage of the image data within the storage;
form a wireless coupling with a receiving device; and
in response to formation of the wireless coupling and the storage of the image data within the storage, wirelessly transmit the image data from the storage to the receiving device.

2. The relay device of claim 1, additionally comprising a controller, wherein the controller is configured to:

compare the image data to previously received image data to determine whether the image data is a duplicate of the previously received image data;
in response to a determination that the image data is not a duplicate of the previously received image data, store the image data within the storage; and
in response to a determination that the image data is a duplicate of the previously received image data, discard the image data.

3. The relay device of claim 2, wherein the controller is configured to:
compare an amount of currently available storage space within the storage to a predetermined threshold amount of available storage space to determine if the amount of currently available storage space meets the threshold; and
condition the storage of the image data within the storage on a determination that the amount of currently available storage space meets the predetermined threshold.

4. The relay device of claim 2, wherein the controller is configured to:
detect a conflict between wireless transmissions of the image data from multiple cameras;
wirelessly receive the wireless transmission of the image data from one of the multiple cameras that is designated as having higher priority than at least one other camera of the multiple cameras; and
refrain from wirelessly receiving the wireless transmission of the image data from the at least one other camera of the multiple cameras.

5. The relay device of claim 2, wherein:
the controller is configured to determine which portion of multiple portions of the image data stored within the storage is earliest, wherein the determination is based on when each portion was received by the relay device or the determination is based on an indication of time and date of capture by a camera within each portion; and
the transmission of the image data form the storage comprises transmission of the earliest portion ahead of all other portions of the multiple portions of the image data.

6. The relay device of claim 1, additionally comprising:
a memory card receptacle integrated with the band and configured to removably receive a memory card such that the memory card may be removed from the receptacle of the band; and
a data interface mounted on the band and configured to access storage space within the memory card while the memory card is received in the memory card receptacle.

7. The relay device of claim 6, wherein the storage comprises the memory card.

8. The relay device of claim 6, additionally comprising a controller, wherein:
the memory card provides storage space in addition to storage space provided by the storage; and
the controller is configured to:
prioritize use of a preselected one of the storage space within the storage and the storage space within the memory card to store the image data;
compare an amount of currently available combined storage space within the storage and the memory card to a predetermined threshold amount of available storage space to determine if the amount of currently available combined storage space meets the threshold; and
condition the storage of the image data within the storage space of at least one of the storage and the memory card on a determination that the amount of currently available combined storage space meets the predetermined threshold.

9. The relay device of claim 6, additionally comprising a controller, wherein the controller is configured to retrieve the image data from the memory card as an alternative to wirelessly receiving the image data in the wireless transmission from the at least one camera.

10. The relay device of claim 6, additionally comprising a controller, wherein the controller is configured to store the image data within the memory card to enable use of the memory card as a transfer medium to provide the image data to the receiving device as an alternative to wirelessly transmitting the image data to the receiving device.

11. The relay device of claim 1, additionally comprising a memory card receptacle integrated with the band and configured to removably receive a memory card such that the memory card may be removed from the receptacle of the band, wherein no electrical connection is formed with the memory card while the memory card is received in the memory card receptacle.

12. The relay device of claim 1, wherein:
the transceiver is configured to receive the transmission of the image data from the at least one camera while the relay device is worn by the wearer at a first location at which the at least one camera is present;
the transceiver is configured to transmit the image data from the storage to the receiving device while the relay device is worn by the wearer at a second location at which the receiving device is present; and
the storage is configured to retain the image data while the relay device is carried from the first location to the second location.

13. A non-transitory machine-readable medium storing instructions that, when executed by a control processor of a wearable wireless image data relay device comprising a band configured to at least partially encircle a limb of a wearer, cause the control processor to operate a transceiver of the relay device to:
detect wireless transmission of image data from at least one camera, wherein the image data is captured by the at least one camera;
wirelessly receive the transmission of the image data from the at least one camera to enable storage of the image data within a storage of the relay device;
form a wireless coupling with a receiving device; and
in response to formation of the wireless coupling and the storage of the image data within the storage, wirelessly transmit the image data from the storage to the receiving device.

14. The non-transitory machine-readable medium of claim 13, wherein the control processor is caused to:
compare the image data to previously received image data to determine whether the image data is a duplicate of the previously received image data;
in response to a determination that the image data is not a duplicate of the previously received image data, store the image data within the storage; and
in response to a determination that the image data is a duplicate of the previously received image data, discard the image data.

15. The non-transitory machine-readable medium of claim 13, wherein the control processor is caused to:
compare an amount of currently available storage space within the storage to a predetermined threshold amount of available storage space to determine if the amount of currently available storage space meets the threshold; and condition the storage of the image data within the storage on a determination that the amount of currently available storage space meets the predetermined threshold.

16. The non-transitory machine-readable medium of claim 13, wherein the control processor is caused to:
   detect a conflict between wireless transmissions of the image data from multiple cameras;
   wirelessly receive the wireless transmission of the image data from one of the multiple cameras that is designated as having higher priority than at least one other camera of the multiple cameras; and
   refrain from wirelessly receiving the wireless transmission of the image data from the at least one other camera of the multiple cameras.

17. The non-transitory machine-readable medium of claim 13, wherein:
   the control processor is caused to determine which portion of multiple portions of the image data stored within the storage is earliest, wherein the determination is based on when each portion was received by the relay device or the determination is based on an indication of time and date of capture by a camera within each portion; and
   the transmission of the image data form the storage comprises transmission of the earliest portion ahead of all other portions of the multiple portions of the image data.

18. The non-transitory machine-readable medium of claim 13, wherein:
   the relay device comprises a memory card receptacle integrated with the band and configured to removably receive a memory card such that the memory card may be removed from the receptacle of the band; and
   the control processor is caused to:
      prioritize use of a preselected one of storage space within the storage and storage space within the memory card to store the image data;
      compare an amount of currently available combined storage space within the storage and the memory card to a predetermined threshold amount of available storage space to determine if the amount of currently available combined storage space meets the threshold; and
      condition the storage of the image data within the storage space of at least one of the storage and the memory card on a determination that the amount of currently available combined storage space meets the predetermined threshold.

19. The non-transitory machine-readable medium of claim 13, wherein the storage comprises a memory card.

20. A processor-implemented method comprising:
   detecting, with a transceiver mounted on a band of a wearable wireless image data relay device, wireless transmission of image data from at least one camera, wherein:
      the image data is captured by the at least one camera; and
      the band is configured to at least partially encircle a limb of a wearer;
   wirelessly receiving, with the transceiver, the transmission of the image data from the at least one camera to enable storage of the image data within a storage of the relay device;
   forming, with the transceiver, a wireless coupling with a receiving device; and
   in response to formation of the wireless coupling and the storage of the image data within the storage, wirelessly transmitting, with the transceiver, the image data from the storage to the receiving device.

* * * * *